(12) United States Patent
Renaud-Goud

(10) Patent No.: US 8,398,243 B2
(45) Date of Patent: Mar. 19, 2013

(54) PROJECTION DEVICE FOR THE HOLOGRAPHIC RECONSTRUCTION OF SCENES

(75) Inventor: Philippe Renaud-Goud, Troyes (FR)

(73) Assignee: Seereal Technologies S.A., Munsbach (LU)

(*) Notice: Subject to any disclaimer, the term of this patent is extended or adjusted under 35 U.S.C. 154(b) by 600 days.

(21) Appl. No.: 12/161,473

(22) PCT Filed: Jan. 15, 2007

(86) PCT No.: PCT/IB2007/001476
§ 371 (c)(1),
(2), (4) Date: Jun. 16, 2010

(87) PCT Pub. No.: WO2007/099457
PCT Pub. Date: Sep. 7, 2007

(65) Prior Publication Data
US 2010/0271676 A1  Oct. 28, 2010

(30) Foreign Application Priority Data
Jan. 20, 2006  (DE) .......................... 10 2006 004 300

(51) Int. Cl.
| G03B 21/26 | (2006.01) |
| G03B 21/28 | (2006.01) |
| G03H 1/08  | (2006.01) |
| G03H 1/16  | (2006.01) |
| G03H 1/26  | (2006.01) |
| G02B 1/10  | (2006.01) |
| G02B 27/14 | (2006.01) |
| G02B 27/12 | (2006.01) |
| G02B 27/46 | (2006.01) |
| H04N 5/89  | (2006.01) |

(52) U.S. Cl. .............. 353/30; 353/98; 353/121; 353/10; 359/9; 359/29; 359/22; 359/32; 359/583; 359/629; 359/639; 359/559; 348/40

(58) Field of Classification Search .................... 353/30, 353/98, 99, 121, 10; 359/9, 29, 22, 32, 583, 359/629, 639, 559; 348/40
See application file for complete search history.

(56) References Cited

U.S. PATENT DOCUMENTS
5,172,251 A    12/1992 Benton et al.
8,149,265 B2 *  4/2012 Smalley et al. ................. 348/40
(Continued)

FOREIGN PATENT DOCUMENTS
| DE | 103 11 306 A1 | 9/2004 |
| GB | 2 363 273     | 12/2001 |
| JP | 09-068674     | 3/1997 |

OTHER PUBLICATIONS

International Search Report issued in priority International Application No. PCT/IB2007/001476.
Fukaya et al., "Eye-position tracking type electro-holographic display using liquidcrystal devices," Asia Display, pp. 963-963, 1995 (XP002940561).

*Primary Examiner* — Georgia Y Epps
*Assistant Examiner* — Magda Cruz
(74) *Attorney, Agent, or Firm* — Saul Ewing LLP

(57) ABSTRACT

The present invention relates to a projection device for holographic reconstruction of scenes, said device comprising at least one light modulator device and at least one light source which emits sufficiently coherent light for the generation of a wave front of a scene, which is encoded in the light modulator device. A Fourier transform (FT) of the light which is emitted by the light source and modulated by the light modulator device is projected by a projection means on to a screen. Further, the wave front which is encoded on the light modulator device is projected by the projection means into at least one virtual observer window in an observer plane. For tracking the observer window according to a change in an eye position of the at least one observer, the inventive device comprises at least one deflection means, which is disposed between the light modulator device and the screen.

19 Claims, 7 Drawing Sheets

U.S. PATENT DOCUMENTS

2009/0086296 A1* 4/2009 Renaud-Goud .................. 359/9
2010/0033784 A1* 2/2010 Renaud-Goud ................ 359/29
2010/0045781 A1* 2/2010 Flon et al. ...................... 348/51
2010/0079831 A1* 4/2010 Renaud-Goud .................. 359/9

* cited by examiner

PROJECTION DEVICE FOR THE HOLOGRAPHIC RECONSTRUCTION OF SCENES

CROSS REFERENCE TO RELATED APPLICATIONS

This application claims the priority of PCT/IB2007/001476, filed on Jan. 15, 2007, which claims priority to DE 10 2006 004300.6, filed Jan. 20, 2006, the entire contents of which are hereby incorporated in total by reference.

The present invention relates to a projection device for holographic reconstruction of scenes, said device comprising at least one light modulator device and at least one light source which emits sufficiently coherent light to generate a wave front of a scene, which is encoded in the light modulator device. This invention further relates to a method for the holographic reconstruction of scenes.

Holography allows three-dimensional objects to be recorded and optically represented using wave-optical methods. The representation of the holographic image, often referred to as reconstruction, is realised with the help of a projection device and, depending on the type of hologram, by illuminating a hologram-bearing medium with sufficiently coherent light. The hologram used may be a true hologram or a computer-generated hologram (CGH).

Usually, the reconstruction is viewed directly, i.e. the observer looks on to the computer-generated hologram, for example, which consists of regularly arranged pixels which have been encoded in accordance with the hologram values. Due to the discrete recording and because of the effects of deflection, the reconstruction of the CGH is only possible within one periodicity interval which is defined by the resolution of the CGH-bearing medium. The reconstruction is typically repeated showing irregularities in adjacent periodicity intervals.

Recording media for CGHs include spatial light modulators, such as liquid crystal displays (LCD), liquid crystal on silicon (LCoS) etc., which modulate the phase and amplitude of incident light. Optical elements which transform the CGH into the desired plane are also often used for reconstructing two- and three-dimensional scenes. The refresh rate of the projection device must be sufficiently high for scene reconstruction, so as to achieve a high image quality of moving two- and three-dimensional scenes.

U.S. Pat. No. 5,172,251, for example, discloses a projection device with a one-dimensional light modulator for reconstructing a three-dimensional scene. The light modulator is an acousto-optic modulator which is controlled by modulation signals of a data processing system, thus encoding a one-dimensional hologram. The reconstruction is diminished with the help of several optical elements, so as to increase the viewing angle in the horizontal direction. A horizontal scanner continuously combines partial holograms of the scene and balances the movement of the partial holograms along the modulator. The horizontal scanner is synchronised with the speed of the acoustic wave, so that the scanned areas of the original image from the modulator appear fixed in the reconstructed scene. In addition, a vertical scanner is provided in order to position in the vertical direction the horizontal one-dimensional holograms.

However, because that projection device uses an acousto-optic modulator (AOM), it exhibits the disadvantage of requiring additional elements such as the horizontal scanner which aims to balance the signal movement. This makes the design rather difficult and complex. Another drawback is the small aperture of the AOM, which requires sub-holograms to be stringed together.

Further, light modulators are known for example from Patent Abstracts of Japan No. 09068674 A. That abstract and the accompanying drawing describe a device for reconstructing a three-dimensional scene with the help of two spatial light modulators (SLM). Each light modulator with the corresponding hologram is intended for one eye of one observer. A lens element and a rotating mirror element are disposed between the light modulators and the observer. The three-dimensional scene is reconstructed in the region of or on the rotating mirror element. Any observer movement is identified by a position detection system and the rotating mirror element is tilted around its horizontal or vertical axis so as to follow the new position of the observer eyes. At the same time, the view of the three-dimensional scene that corresponds with the new observer position is shown in the holograms.

The rotating mirror element acts as a monitor in that projection device and is used to track the observer windows at the same time. Therefore, the reconstruction of the three-dimensional scene is limited by the extension of that element. Moreover, the reconstructed scene may show irregularities caused by the movement of the rotating mirror element. This means in particular that the appearance of the reconstructed scene will differ depending on the actual viewing direction. This makes it rather inconvenient for the observer to view the scene. Further, the reconstructed scene is limited by the relatively small dimensions of the two light modulators.

Patent Abstracts of Japan No. 09138631 describes a holographic device for displaying a moving three-dimensional scene, where an observation distance from an observer to a scene shall be kept small. The device comprises a light source, a light modulator, imaging elements for imaging the light and a field lens, which is disposed near or at the same position as the reconstructed scene. Because the field lens here also serves as a screen, the extent of the three-dimensional scene is limited by the dimensions of the field lens.

Now, the object of this invention is to provide a device and method for holographic reconstruction of scenes which prevails over the afore-mentioned disadvantages of the prior art, said device and method being able to deliver reconstructions of two- and three-dimensional scenes with high image quality to multiple observers even if at least one of the observers moves, where the projection device shall be of simple structure and inexpensive to manufacture.

According to the present invention, this object is solved by imaging means for imaging a Fourier transform of the light modulated by the light modulator device on to a screen, and for imaging the wave front encoded on the light modulator device into at least one virtual observer window situated in an observer plane, and at least one deflection means for tracking the observer window according to a change in an eye position of at least one observer, said deflection means being disposed between the light modulator device and the screen.

The projection device according to this invention comprises at least one light modulator device, which is illuminated by an illumination device that comprises a light source which emits sufficiently coherent light. The light modulator device is preferably a spatial light modulator, in particular a phase modulator. The Fourier transform of the light emitted by the light source and modulated by the light modulator device is imaged by imaging means, in particular lenses and/or mirrors, on to an optical element which serves as a screen, and the wave front encoded on the light modulator device is imaged into a virtual observer window, which is situated in an observer plane in which one or multiple observers can view a reconstructed two- or three-dimensional scene. The observer window is called virtual because it does not exist physically. It is just an imaginary window in front of one or both of the observer eyes, through which the reconstructed scene can be viewed at sufficient quality. According to this invention, the observer window is tracked with the help of at least one deflection means according to the movement of the observer(s), which is identified with the help of their new eye positions. The deflection means is disposed within the projection device, more specifically between light modulator device and screen. Such deflection means may be mechanical, electric, magnetic or optical elements, such as acousto-optic elements.

This way a holographic projection device is provided which is used for simple and quick reconstruction of two- and three-dimensional scenes at high image quality, and which allows one to track the observer window. The fact that the deflection means used to track the observer window is disposed within the projection device makes it insensitive to ambient influences. Further, the light modulator device used is preferably an extended spatial light modulator and no limited modulator, such as an acousto-optic modulator, which makes additional elements such as the horizontal scanner of U.S. Pat. No. 5,172,251 and their arrangement within the projection device redundant. This contributes to a compact design of the appliance.

In one embodiment of the invention, the reproduction scale and screen size can be chosen such that the periodic continuation of diffraction orders of the Fourier transform lies outside the screen. This has the advantage that the periodic continuation of the diffraction orders is displaced out of the screen, and only one period is visible on the screen. This means that an observer does not perceive the periodic continuation of the reconstruction in the various diffraction orders. The image quality is thus considerably improved compared with conventional appliances.

In a further embodiment of the invention, the light modulator device may be a one-dimensional light modulator device, wherein for the generation of a two-dimensional wave front for a reconstructed scene a deflection element is provided, which realises an optical deflection perpendicular to the one-dimensional light modulator device.

If a one-dimensional spatial light modulator device is provided, the projection device according to this invention can comprise a deflection element, preferably a galvanometer scanner (mirror galvanometer) or a polygonal mirror for quick deflection of a light beam, in order to generate a two-dimensional wave front for the display of a reconstructed scene. Wave fronts of columns or rows (depending on whether the one-dimensional light modulator device is arranged vertically or horizontally) are thereby strung together with the help of the deflection element.

In order to make available the observer window for the observer(s) in a large region, a position detection system may be used to detect changes in the eye position of the observer in the observer plane when viewing the reconstructed scene.

The position detection system detects the eye positions of one or multiple observers while viewing the reconstructed scene, and encodes the scene accordingly. This is particularly advantageous in order to be able to update the position and/or content of the reconstructed scene according to a changed eye position. Then, the observer window can be tracked according to the new eye position.

According to another preferred embodiment of this invention, at least one beam splitter element may be disposed between the deflection means and the light modulator device. In the case a two-dimensional binary light modulator device is used, alongside this beam splitter element, which is used for colour reconstruction of a scene, another beam splitter element is provided for the reproduction of a wave front emitted from the light modulator device.

At least one beam splitter element disposed in the projection device can be employed for colour reconstruction of the scene if a one- or two-dimensional light modulator device is used. If a two-dimensional binary light modulator device is used, in addition to the beam splitter element for colour reconstruction a second beam splitter element may be provided which reproduces a wave front emitted by the light modulator device. This additional beam splitter element can for example be a grating or a diffractive optical element (DOE).

The object of this invention is further solved by a method for holographic reconstruction of scenes where a Fourier transform of the light emitted by the light source and modulated by the light modulator device is imaged on to an optical element which serves as a screen, where at least the optical element images the encoded wave front into at least one virtual observer window in an observer plane, and where at least one deflection means tracks the observer window according to a change in an eye position of at least one observer in the observer plane.

According to the novel method, light of an illumination device, which emits sufficiently coherent light, is directed on to at least one light modulator device for holographic reconstruction of two- and/or three-dimensional scenes. The Fourier transform of the light emitted by the illumination device and modulated by the light modulator device is then imaged on to an optical element, in particular on to a screen, preferably on to a mirror. The wave front encoded in the light modulator device is then preferably imaged with the help of the screen into an observer window in an observer plane, through which an observer views the reconstructed, preferably three-dimensional scene. The observer window is tracked in the observer plane according to detected changes in the eye positions of at least one observer with the help of a deflection means. The deflection means is disposed between the light modulator device and the optical element serving as a screen. The method according to the present invention is preferably used to operate a projection device according to one of the claims 1 to 12.

The advantage of the method according to this invention is that the two- and/or three-dimensional scene can be reconstructed in a large reconstruction volume, providing a high image quality at the same time. Moreover, this method allows the observers to move in the observer plane, so that no fixed observer position in front of the screen is necessary in order to be able to view the reconstructed scene. According to the novel method, it is possible to show at least one observer a large, reconstructed three-dimensional scene with true depth effect (instead of the depth effect of a known autostereoscopic display with parallax images), even if this observer may move to another position. The fact that the wave front is modulated directly makes redundant the calculation of a transform in order to obtain a hologram. Further, only one Fresnel transform of the object into the observer window is necessary for calculating the modulated wave front. This makes redundant an additional Fourier transform of the object wave front into the hologram, as would be required by prior art projection devices.

According to a preferred embodiment of this invention, the scene may be reconstructed in the zeroth diffraction order. This is particularly preferable because the brightness is greatest in the zeroth diffraction order.

Further embodiments of the invention are defined by the other dependent claims. Embodiments of the present invention will be explained in detail below and illustrated in conjunction with the accompanying drawings. The principle of the invention will be explained based on a holographic reconstruction with monochromatic light. However, it will appear to those skilled in the art that this invention may as well be applied to colour holographic reconstructions, as indicated in the description of the individual embodiments.

Figure 1:
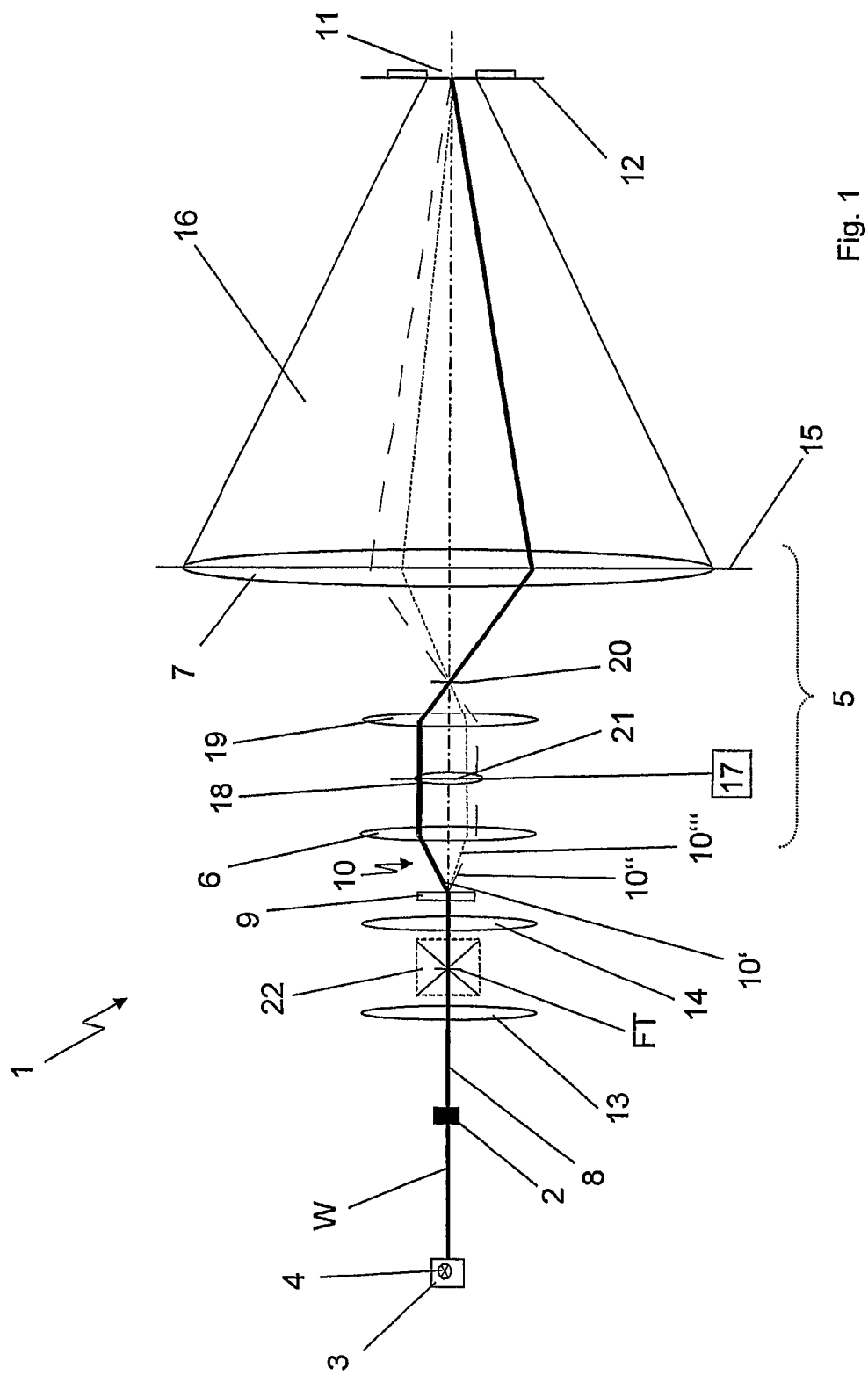
FIG. 1 shows the working principle of a holographic projection device according to this invention with a one-dimensional light modulator device for the reconstruction of three-dimensional scenes (top view).

FIG. 1 is a top view which shows schematically a holographic projection device 1 for the reconstruction of two-dimensional and/or three-dimensional scenes. For easier understanding, the holographic projection device 1 is shown in a simplified manner as a transmissive device in FIG. 1 et seqq. Now, the basic set-up of the holographic projection device 1 will be described. The projection device 1 comprises a light modulator device 2, here a phase modulator, which modulates an incident wave front. As can be seen in this embodiment, the light modulator device 2 is a one-dimensional light modulator device, which is arranged vertically here. However, it may as well be arranged horizontally. The light modulator device 2 is illuminated by an illumination device 3, more precisely by a line light source 4, which emits sufficiently coherent light. In this document, the term 'sufficiently coherent light' denotes light which is capable of generating interference for the holographic reconstruction of a three-dimensional scene. The light source 4 of the illumination device 3 can be made of laser diodes, DPSS lasers (diode-pumped solid state lasers) or other lasers. Conventional light sources can be used as well as long as they emit sufficiently coherent light. However, such light sources should be filtered so as to achieve a sufficient degree of coherence. The holographic projection device 1 further comprises imaging means, in particular an optical system 5. The simplest variant of this optical system 5 comprises an imaging means 6 and an optical element 7 which serves as a screen. The optical element 7 will be referred to as screen below Of course, the optical system 5 can also comprise further optical elements, for example as can be seen and as will be described in more detail below. The screen 7 is preferably a mirror, in particular a concave mirror. The screen 7 can also be any other imaging optical element, e.g. a lens, as shown in the Figure. If the screen 7 is a concave mirror, there will be the advantage that the size of the optical system of the holographic projection device 1 is substantially smaller than that of a transmissive device which uses lenses only. The screen 7 must in any case not have a diffusing surface, so that a wave front 8 reflected from the light modulator device 2 is not disturbed. The imaging means 6 is also a mirror or lens. A wave W, which is emitted by the light source 4 and which is assumed to be plane, arrives at the light modulator device 2 and is modulated such that the wave front of the plane wave W is encoded on equidistant positions in the light modulator device 2 to form a desired wave front 8. This wave front 8 is imaged on to a deflection element 9 by lens elements 13 and 14 so as to reconstruct a two- and/or three-dimensional scene. Such a deflection element 9 may be a galvanometer scanner, piezo-scanner, resonance scanner, micro-mirror array, polygon mirror or similar device, such as an acousto-optic, electro-optic or even magnetic device. The deflection element 9 effects an optical deflection of the wave front 8 perpendicular to the light modulator device 2, so as to generate a two-dimensional wave front 10. The two-dimensional wave front 10 consists of a sequence of parallel one-dimensional wave fronts 10', 10", 10'" ... generated by that deflection. The optical system 5 then images the two-dimensional wave front 10 into a virtual observer window 11 situated in an observer plane 12, where an observer eye views the reconstructed scene. The sufficiently coherent light emitted by the light source 4 is imaged on to the screen 7 at the same time. Thereby, a Fourier transform FT of the information encoded in the wave front is generated between lens elements 13 and 14, in the image-side focal plane of lens element 13. The imaging means 6 of the optical system 5 images the Fourier transform FT into a plane 15 on the screen 7. The reconstructed scene can be viewed by the observer in an enlarged reconstruction volume 16, which is formed by a frustum that stretches between the observer window 11 and screen 7. The reconstructed scene may appear in front of, on or behind the screen 7.

The three-dimensional scene is reconstructed in the zeroth diffraction order. This is particularly preferable, because the brightness or luminous intensity is greatest in the zeroth diffraction order.

Further, it is also possible to integrate the deflection element 9 directly into the light modulator device 2. This means that the light modulator device 2, which is used to generate the two-dimensional wave front 10, is displaced as a whole. The lens elements 13 and 14 are not necessary in this case. The light modulator device 2 is then disposed next to the deflection element 9, i.e. in the object-side focal plane of the imaging means 6. Consequently, a beam splitter element 22 for colour reconstruction of the scene can be disposed between the light modulator device 2 and imaging means 6, for example. This makes it possible to give the holographic projection device 1 a more compact overall design.

However, the holographic projection device 1 may optionally comprise the lens elements 13 and 14 in the optical path. The lens elements 13 and 14 have the same refractive power in order to minimise aberrations, as can be seen here by the individual focal lengths. However, the lens elements 13 and 14 may also have different refractive power or focal lengths in order to modify or optimise the size of the one-dimensional wave front 8 on the deflection element 9. The lens elements 13 and 14 have another advantage in this case. They ensure that the wave front 8 emitted by the light modulator device 2 to be imaged on to the deflection element 9 generates the two-dimensional wave front 10. An afocal system, represented here by the lens elements 13 and 14, can be used to image the wave front 8 on to the deflection element 9. Thereby, a Fourier transform FT of the wave front 8 is generated in the image-side focal plane of lens element 13. With the help of lens element 14 and imaging means 6, the Fourier transform is imaged on to the screen 7.

The deflection element 9 can alternatively be disposed between the light source 4 and the light modulator device 2.

This has the advantage that aberrations during encoding of the two-dimensional wave front 10 are eliminated or minimised as far as possible, because the plane wave front W has not yet been encoded when it arrives at the light modulator device 2.

The projection device 1 shown here comprises in addition a position detection system 17 to detect an eye position of an observer in the observer plane 12. The position detection system 17 can be a camera. A deflection means 18 is disposed between the imaging means 6 and screen 7, preferably in the image-side focal plane of the imaging means 6, for tracking the observer window 11 in accordance with changes in the observer eye position. The deflection means 18 can be discretely controlled and is preferably a mirror. A very precisely working deflection means is required for proper tracking of the observer window 11. This is why the deflection means 18 can be a galvanometer scanner. Of course, it is also possible to use other deflection means, such as MEMS arrays, polygon scanners or an acousto-optic arrangement. Further, the deflection means 18 can deflect in at least one, i.e. the horizontal and/or the vertical direction. This means that the one-dimensional version of the deflection means 18 is only able to track the observer window 11 in either the horizontal or the vertical direction. The two-dimensional version of the deflection means 18 is able to track the observer window 11 in both the horizontal and the vertical direction. The deflection means 18 can be an xy-type galvanometer scanner, or two galvanometer scanners can be arranged behind one another, where one is used for horizontal tracking and the other for vertical tracking. The deflection element 9 for tracking the observer window 11 must be synchronised with the deflection means 18. Further, a second imaging means 19 is provided behind the deflection means 18, seen in the direction of light propagation. Because of the great magnification required by the image of the Fourier transform to fill the screen 7, the second imaging means 19 can be a system of lenses instead of a single lens, so as to avoid or minimise aberrations. If no second imaging means 19 is provided, imaging means 6 must be a lens or lens system.

Now, the reconstruction of the three-dimensional scene will be described in more detail with the help of this embodiment. The wave front W emitted by the light source 4 arrives at the light modulator device 2, whereby the wave front W is modulated. Then, the modulated wave front 8 proceeds through the lens elements 13 and 14, which image it on to the deflection element 9. At the same time, the Fourier transform FT of the wave front 8 is generated by the lens element 13 in the image-side focal plane of lens element 13. After its generation, the two-dimensional wave front 10 is imaged by the imaging means 6 on to the deflection means 18. Any observer movement in the observer plane 12 is identified by a position detection system 17. The observer window 11 can be tracked by controlling the deflection means 18 according to the position information provided by the position detection system 17. The imaging means 6 and 19 generate in a focal plane 20 of the second imaging means 19 an image of the two-dimensional wave front 10. This two-dimensional image in the focal plane 20 is then imaged through the screen 7 into the observer window 11. At the same time, the image of the Fourier transform FT is generated in an image-side focal plane 21 of imaging means 6. The second imaging means 19 then images the image of the Fourier transform FT on to the screen 7.

The above described holographic projection device 1 was described for one observer eye only. It is sensible to provide a second light modulator device 2 to be able to serve a pair of observer eyes. The optical elements of the existing holographic projection device 1 can be used for this. If the observer is situated in the observer plane 12 and looks through the observer window 11, he can view the reconstructed three-dimensional scene in the reconstruction volume 16, and the scene is reconstructed in front of, on or behind the screen 7, seen in the direction of light propagation. However, it is also possible to provide the pair of observer eyes with a reconstructed scene using only one light modulator device 2, which is arranged horizontally.

Colour reconstruction of the three-dimensional scene is also possible with the help of the holographic projection device 1. As shown in FIG. 1, a beam splitter element 22, preferably a prism block, is disposed in front of the imaging means 6, seen in the direction of light propagation. The beam splitter element 22, which is preferably an X prism with dichroic layers, splits red, green and blue light into three separate wave fronts or recombines them to form a common modulated wave front. Of course, any other beam splitter element may be used for colour reconstruction. Colour reconstruction of the scene is thereby achieved by simultaneously processing the three primary colours, RGB (red, green, blue). In this embodiment, the beam splitter element 22 is disposed between the lens elements 13 and 14, but it can as well be disposed at other positions in the holographic projection device 1.

Figure 2:
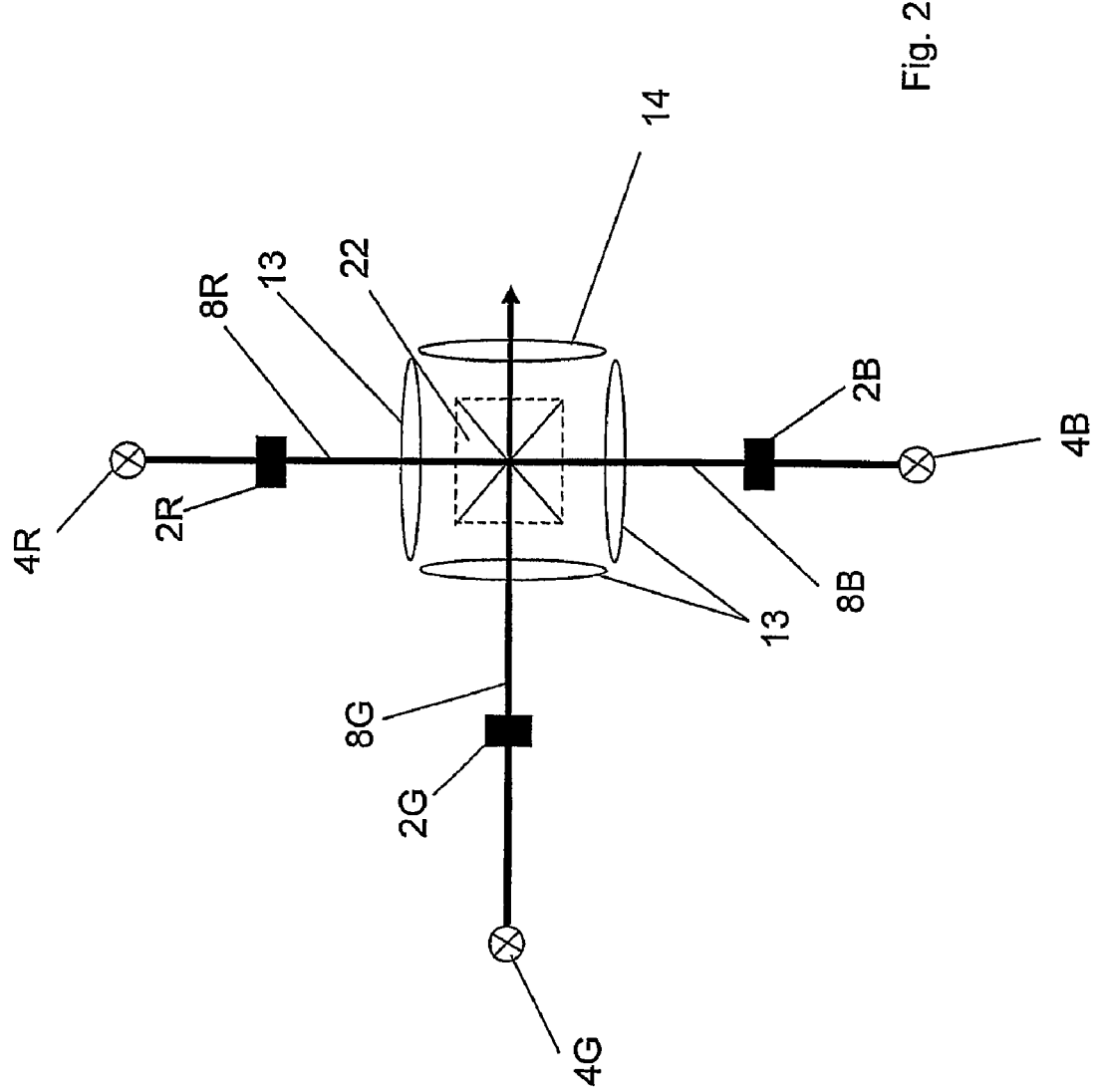
FIG. 2 shows an enlarged detail of the projection device shown in FIG. 1.

FIG. 2 is an enlarged detail showing the beam splitter element 22 of FIG. 1. Three light modulator devices 2R, 2G and 2B are provided for the primary colours, RGB, for simultaneous colour reconstruction of the three-dimensional scene. The three light modulator devices 2R, 2G and 2B are illuminated by three light sources 4R, 4G and 4B. After modulation of the individual wave fronts 8R, 8G and 8B by the corresponding light modulator devices 2R, 2G and 2B, these wave fronts are imaged on to the lens element 14 by the beam splitter element 22 in order to recompose a common wave front. It is further possible that only one light source, in particular a white light source, is used for colour reconstruction. In this arrangement, the beam splitter element 22 is also disposed between the lens elements 13 and 14. However, an additional semi-transmissive mirror is disposed between the beam splitter element 22 and the lens element 14. The light emitted by the light source is directed to the semi-transmissive mirror and, from there, it is imaged by the beam splitter element 22 on to the three light modulator devices 2R, 2G, 2B to illuminate these and to modulate the corresponding wave fronts, where the beam splitter element 22 splits the light up into the three monochromatic wave fronts 8R, 8G and 8B. Further, it is also possible to use only one instead of three light modulator devices for colour reconstruction. However, this option is not shown here. That light modulator device can be illuminated by one light source, which comprises three LEDs in different colours or one white light LED. In addition, at least one optical element, e.g. an acousto-optic element, is required, which images the wave fronts on to the light modulator device at different angles of incidence, for example.

Figure 3:
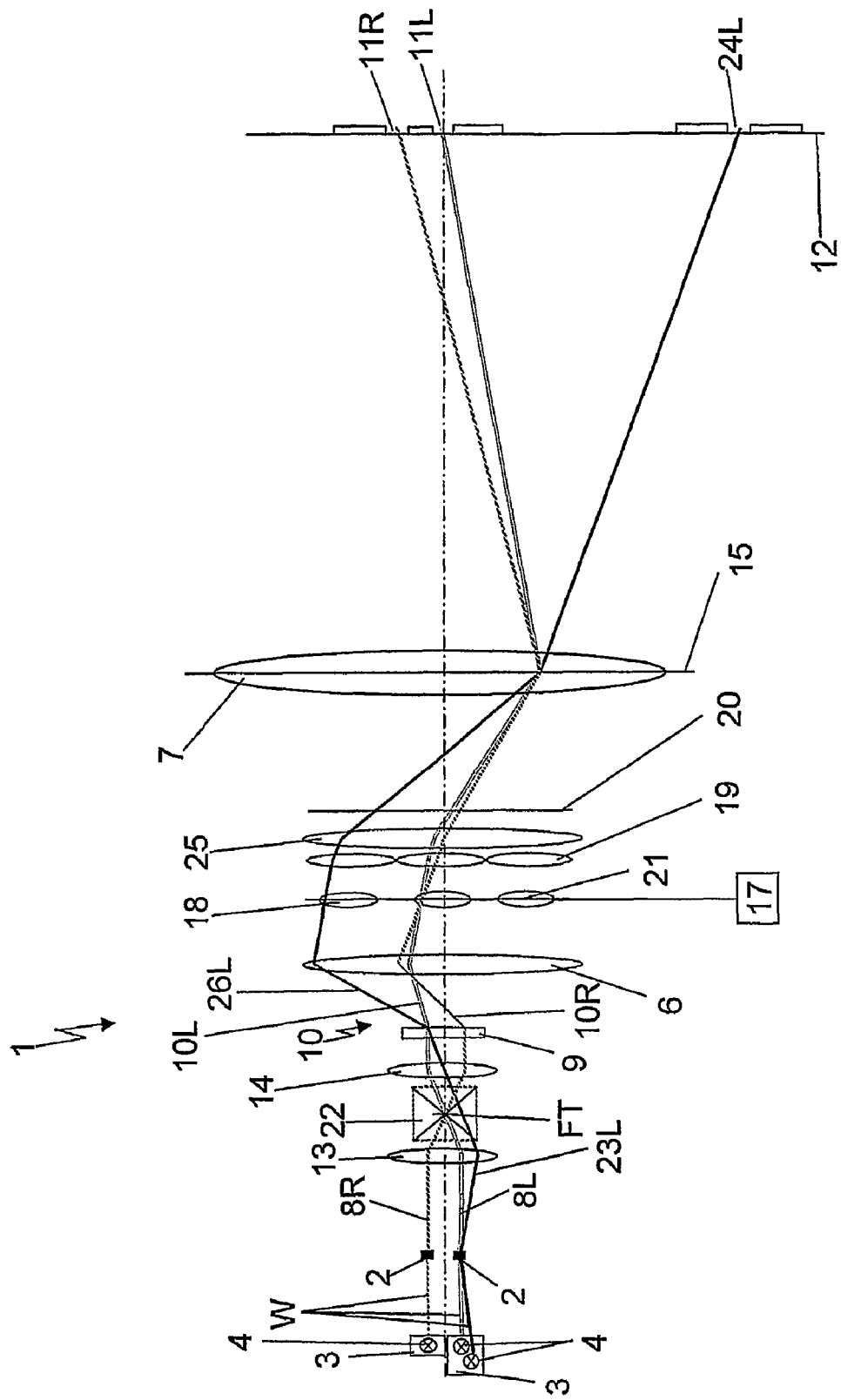
FIG. 3 shows another embodiment of the projection device according to this invention for at least two observers of a reconstructed scene (top view).

FIG. 3 shows another embodiment of the holographic projection device 1. The general layout is identical to that of the projection device 1 shown in FIG. 1. This is why like components are denoted by like numerals. In contrast to the device shown in FIG. 1, the holographic projection device 1 shown here is intended to be used by multiple observers. To keep this diagram comprehensible, the optical paths for only two observers and only a one-dimensional wave front per observer are shown in this embodiment. However, generally more than two observers can view the reconstructed three-dimensional scene. The observer window denoted by the letter R is that for the right eye and the observer windows denoted by the letter L are those for the left eyes of the observers. The holographic projection device 1 shown comprises two light modulator devices 2 for presenting the reconstructed three-dimensional scene. Each of these two light modulator devices 2 is illuminated by at least one illumination device 3 with at least one light source 4. The light sources 4 are independent of each other and cause different angles of incidence. The number of light sources 4 per light modulator device 2 thereby depends on and is determined by the number of observers of the reconstructed scene. In case there are two or more observers, only one light modulator device 2 is used for one type of observer window, i.e. for all observer windows for the observers' right eyes or all observer windows for the observers' left eyes. The light sources 4 illuminate with sufficiently coherent light at different angles of incidence the light modulator device 2. The angles of incidence of the light sources 4 for the observer windows 11R and 11L for the eyes of one observer are thereby almost identical. This means that the angles of incidence of the light emitted by the light sources 4 which generate the modulated wave fronts 8L and 23L for the observer windows 11L and 24L are different. Screen 7, deflection element 9, lens elements 13 and 14 and imaging means 6 and 19 can be used for both light modulator devices 2.

In contrast to FIG. 1, two deflection means 18 are provided for tracking at least two, here three, observer windows 11R, 11L and 24L in accordance with the respective observer eye positions. The number of deflection means 18 depends on the number of observers. This means that per observer only one deflection means 18 is used for both eyes, here for observer windows 11R and 11L. The second imaging means 19 is combined with a focusing element 25 and disposed behind the deflection means 18, seen in the direction of light propagation. The second imaging means 19 is here a lenticular array which aims to collimate the wave fronts 10R and 10L, where the two wave fronts 10R and 10L for the left and right eye run through the lenticule of a second imaging means 19 which is assigned to the first deflection means 18. Once the two wave fronts 10R and 10L have passed the corresponding lenticule of the second imaging means 19, the focusing element 25 aims to overlap and focus the Fourier transform FT on the screen 7. Another deflection means 18 is provided for tracking the observer window 24L for a two-dimensional wave front 26L. The focusing element 25 can be replaced by a more complex arrangement of lenses in order to minimise aberrations. The focusing element 25 can for example be an achromatic lens. There is also the possibility to provide the second imaging means 19 and the focusing element 25 for example as a single lenticular array in the projection device 1.

The three-dimensional scene is reconstructed as already described in conjunction with FIG. 1, with the exception that in this embodiment the holographic projection device 1 is designed to serve multiple observers, so that there are multiple deflection means 18 for tracking the observer windows 11R, 11L and 24L. The holographic projection device 1 described above allows one to simultaneously serve three observer windows.

Instead of using light sources 4 which emit sufficiently coherent light which arrives at each light modulator device 2 at different angles of incidence, it is also possible to use only one light source 4 per light modulator device 2. The wave fronts will in this case be multiplied after modulation by the light modulator device 2. This can be done for example near the deflection element 9 with the help of a grating element. This solution has the advantage that phase defects of wave fronts which are emitted by the single light sources 4 and which arrive at the light modulator devices 2 can be corrected.

As regards FIGS. 1 and 3, the deflection means 18, which is a mirror or mirror arrangement, and which is preferably a galvanometer scanner, can have a light diffusing layer. The deflection means 18 can thus be a mirror which diffuses light in the horizontal direction. The light diffusing layer can be a sheet. The diffused light must propagate at a right angle to the one-dimensional wave front. Because coherence is essential to holographic reconstruction, it must not be influenced by using a light diffusing layer. It is thereby possible, however, to enlarge the observer windows 11, 11R, 11L, 24L in the non-coherent direction, while the observer windows 11, 11R, 11L, 24L are limited in the other direction by the extension of the diffraction orders. It is particularly preferable if the light modulator device 2 is arranged horizontally. This way the individual observer windows 11, 11R, 11L, 24L can be enlarged in the vertical, i.e. the non-coherent direction. This is why it is no longer necessary in this arrangement of the light modulator device 2 to track the observer windows 11, 11R, 11L, 24L to the vertical position of the observer, because the observer windows 11, 11R, 11L, 24L have a large extent in that direction.

Further, there is the possibility to apply the light diffusing layer on to the screen 7, which would then not only serve for imaging and displaying, but also for diffusing the Fourier transform of the wave front in the non-coherent direction.

There are several possibilities for time multiplexing of rows or columns of the modulated wave front 8 when realising two-dimensional wave fronts of a partial image of the reconstructed three-dimensional scene for two or more observers with the help of the deflection element 9 in conjunction with the one-dimensional light modulator device 2 and/or the deflection means 18. A two-dimensional wave front of a partial image is first fully generated for one observer, and then for another observer. Further, it is possible that the rows or columns of the modulated wave front of a partial image associated with the individual observers are shown alternately.

The embodiments of the invention according to FIGS. 1, 2 and 3 always relate to at least one one-dimensional light modulator device 2 for modulating at least one incident wave front. However, this invention can also be realised using two-dimensional light modulator devices.

Now, such embodiments of the projection device 1 will be described with the help of FIGS. 4, 5, 6 and 7.

Figure 4:
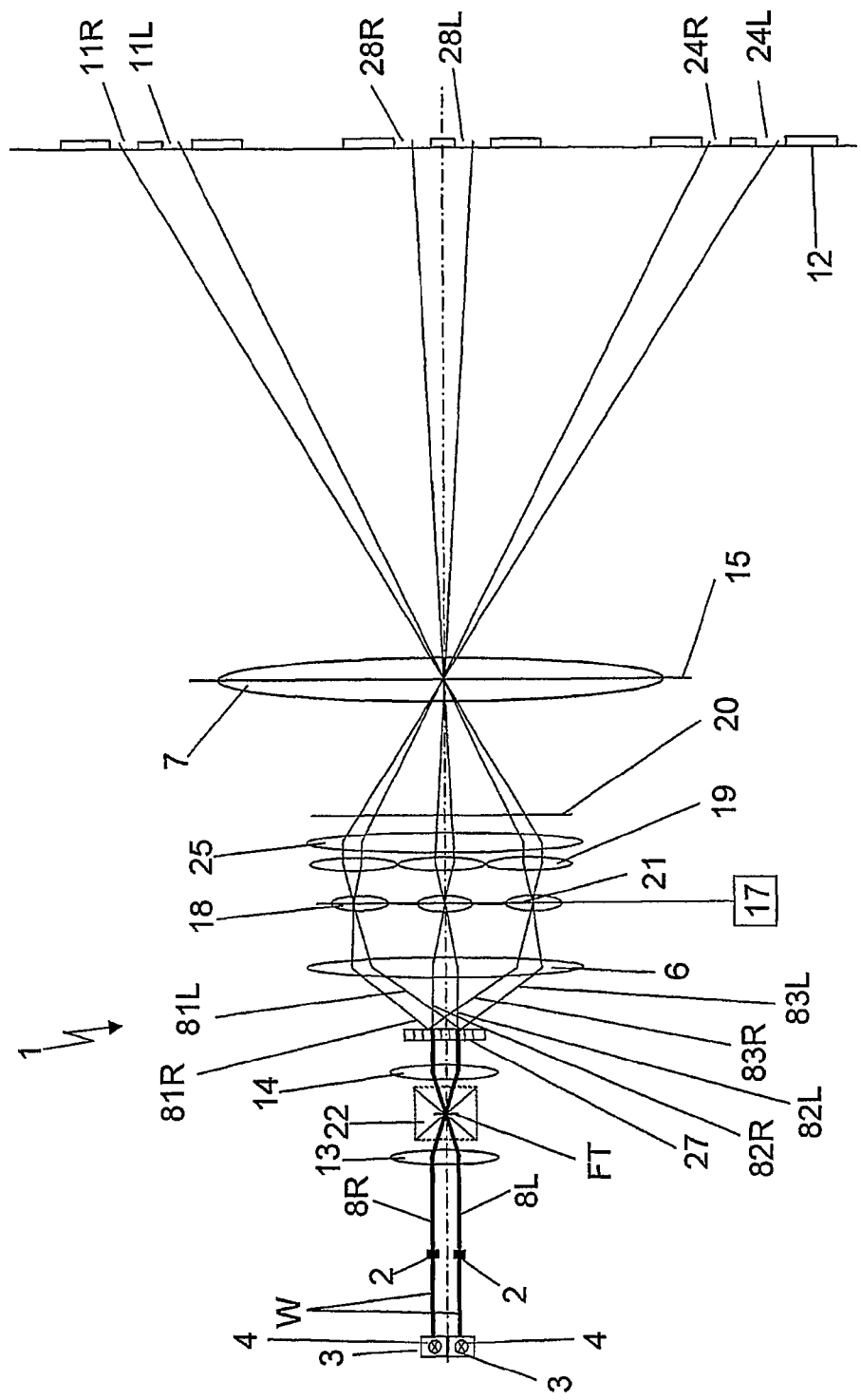
FIG. 4 shows the working principle of a projection device according to this invention with a two-dimensional binary light modulator device (top view).

FIG. 4 shows the top view of another embodiment of the holographic projection device 1. The projection device 1 according to this embodiment is also intended for multiple observers in the observer plane 12. In contrast to FIGS. 1 and 3, the light modulator device 2 is a two-dimensional binary light modulator device in this embodiment. The modulated wave front is binary-coded by such light modulator devices 2. Because the representation of the wave front is very imprecise, several wave fronts are superimposed to reconstruct a scene. A deflection element for generating a two-dimensional wave front is no longer necessary.

Instead of the deflection element 9 shown in FIGS. 1 and 3, the projection device 1 comprises a beam splitter element 27, which is used in addition to the beam splitter element 22, which splits the light up into its spectral components or which recomposes the light from these components, to reproduce the wave fronts 8R and 8L which are emitted by the light modulator devices 2. This beam splitter element 27 is preferably disposed in the image-side focal plane of the lens element 14 and imaging means 6, and it can be a grating or diffractive optical element (DOE), in particular a configurable DOE. Further, it is possible to provide multiple light sources 4 for each light modulator device 2, depending on the number of observers in the observer plane 12, instead of the beam splitter element 27. The light emitted by these light sources 4 should arrive at the light modulator device 2 at different angles of incidence.

For the reconstruction of the scene for the three observers shown in the Figure, the projection device 1 comprises two light modulator devices 2, where one light modulator device 2 is intended for the right observer eyes and the other light modulator device 2 for the left observer eyes. Each of these two light modulator devices 2 is illuminated by at least one illumination device 3 with one light source 4. The light emitted by these light sources 4 is thereby modulated such that the plane waves W are encoded to form the desired wave fronts 8R and 8L at equidistant positions in the light modulator device 2. These wave fronts 8R and 8L are then imaged by the lens elements 13 and 14 on to the beam splitter element 27 for reproduction into multiple wave fronts 81R, 82R, 83R and 81L, 82L, 83L. At the same time, the Fourier transforms FT of the wave fronts 8R and 8L are generated between lens elements 13 and 14, preferably in the focal plane of lens element 13. The Fourier transforms FT are then imaged by the lens element 14 and imaging means 6 into the focal plane 21 of the imaging means 6, in which three deflection means 18 are disposed. First, the wave fronts 81R, 82R, 83R and 81L, 82L, 83L are thereby imaged by the imaging means 6 and 19 and the focusing element 25 into the common focal plane 20 of the second imaging means 19 and focusing element 25, and then these wave fronts are imaged by the screen 7 into the observer windows 11R, 11L, 24R, 24L, 28R and 28L, i.e. on to the eyes of the three observers. At the same time, the images of the Fourier transform FT in the focal plane 21 are imaged on to the screen 7 by the second imaging means 19 and the focusing element 25. The number of deflection means 18 again depends on the number of observers. This means that per observer only one deflection means 18 is used for both eyes, here for observer windows 11R and 11L. The three-dimensional scene is again reconstructed in the zeroth diffraction order. Any movement of an observer in the observer plane 12 is also detected by the position detection system 17, which monitors the eye positions, and the deflection means 18 are controlled such that the observer windows 11R, 11L, 24R, 24L, 28R and 28L are tracked in accordance with the new eye positions of the observers. The three-dimensional scene can be reconstructed in colour as described above using the beam splitter element 22.

Instead of using two light modulator devices 2, it is also possible to use only one light modulator device 2 to reconstruct a scene for one or multiple observers. Accordingly, only one light source will be necessary to illuminate the light modulator device 2.

Figure 5:
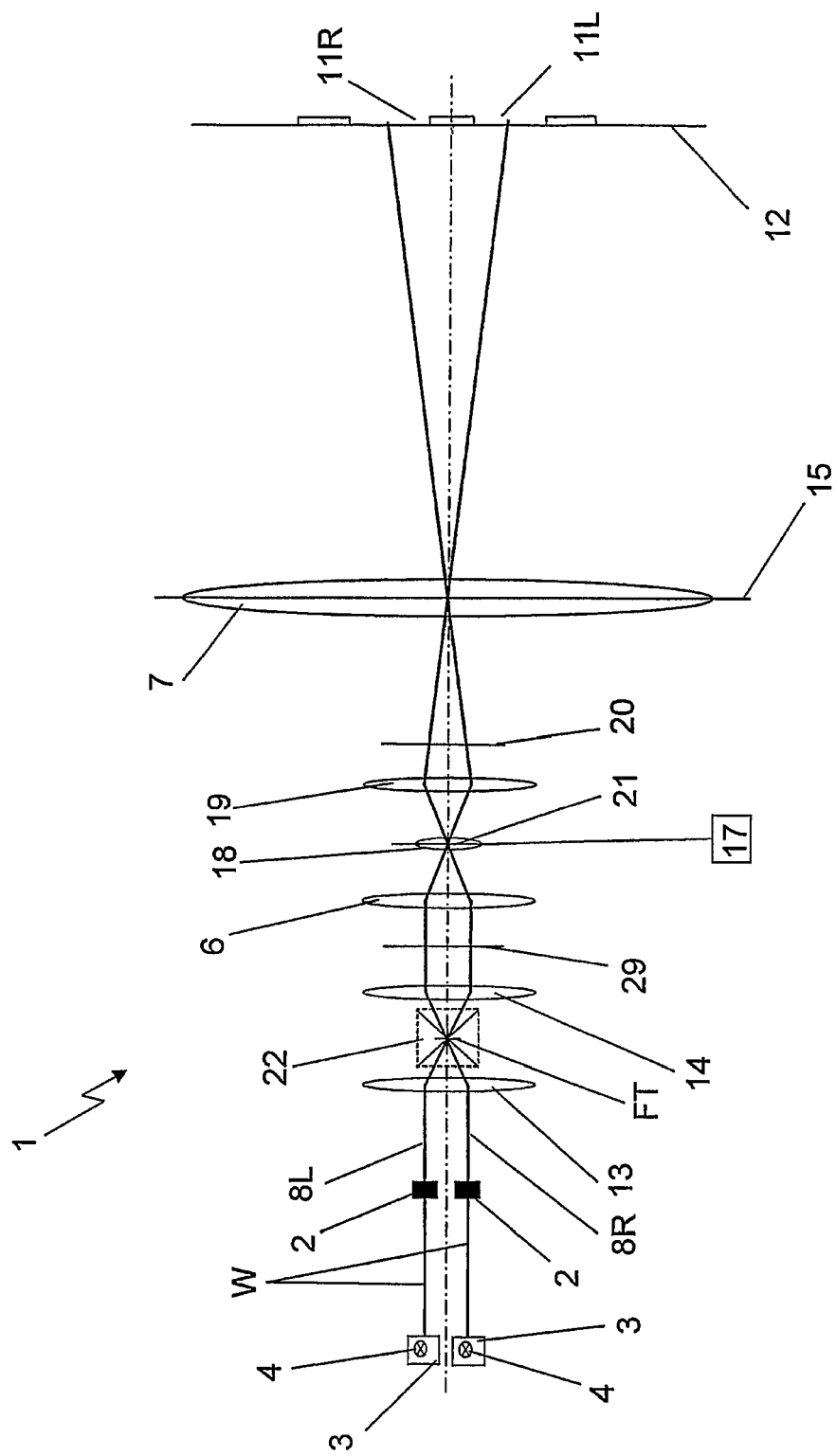
FIG. 5 shows the working principle of a projection device according to this invention with a two-dimensional light modulator device (top view).

FIG. 5 is the top view of a further embodiment of the holographic projection device 1, where only one observer is shown. However, generally multiple observers can watch the reconstructed scene. The light modulator devices 2 used here are also two-dimensional light modulator devices, but in contrast to the above-mentioned binary light modulator devices, these devices allow multi-valued encoding, thus achieving improved representation of the wave fronts directly with only one image, e.g. by processing several phase values. This way the projection device 1 can be structured more simply than shown in FIGS. 1, 3 and 4. A deflection element 9 and a beam splitter element 27 will no longer be necessary. Further, only one deflection means 18 will be sufficient to track the observer windows 11R and 11L or even multiple observer windows.

For the reconstruction of a three-dimensional scene, one light modulator device 2 each is provided for the right and for the left eye. These two light modulator devices 2 are illuminated with sufficiently coherent light by the two light sources 4 of the illumination devices 3. The plane waves W arrive at the light modulator devices 2, where they are encoded to form the desired wave fronts 8R and 8L. The wave fronts 8R and 8L are then imaged by the lens elements 13 and 14 into an image-side focal plane 29, which is situated between the lens element 14 and imaging means 6. At the same time, the Fourier transforms FT of the wave fronts 8R and 8L are generated between lens elements 13 and 14, in the image-side focal plane of lens element 13. The Fourier transforms FT are then imaged by the lens element 14 and imaging means 6 into the focal plane 21. The wave fronts 8R and 8L are then imaged by the imaging means 6 and 19 into the focal plane 20, and further by the screen 7 into the observer windows 11R and 11L and on to the observer eyes. At the same time, the images of the Fourier transforms FT in the focal plane 21 are imaged on to the screen 7 by the second imaging means 19. The wave fronts 8R and 8L for the right and left observer windows 11R and 11L are thereby imaged at the same time. The three-dimensional scene is again reconstructed in the zeroth diffraction order. Any movement of the observer in the observer plane 12 is also detected by the position detection system 17, which monitors the eye positions, and the deflection means 18 is controlled such that the observer windows 11R and 11L are tracked in accordance with the new eye positions of the observer. The three-dimensional scene can also be reconstructed in colour as described above using the beam splitter element 22.

If multiple observers are situated in the observer plane 12, the pair of right and left wave fronts for the observer windows 11R and 11L will be delivered to the individual observers one after another. Then, the next pair of wave fronts will be successively delivered to the individual observers, and so on. Alternatively, it is also possible to deliver the wave front for the right-eye observer window 11R to the individual observers one after another first, and then the wave front for the left-eye observer window 11L to the individual observers one after another. Then the next scene will be reconstructed accordingly.

According to this embodiment, it is thus possible to provide only one light modulator device 2 for both eyes of the observer. If this is the case, the two observer windows 11R and 11L will be served alternately, as described above. If there are multiple observers, all right-eye observer windows 11R, . . . will be served first, and then all left-eye observer windows 11L, . . . (or vice versa).

Figure 6:
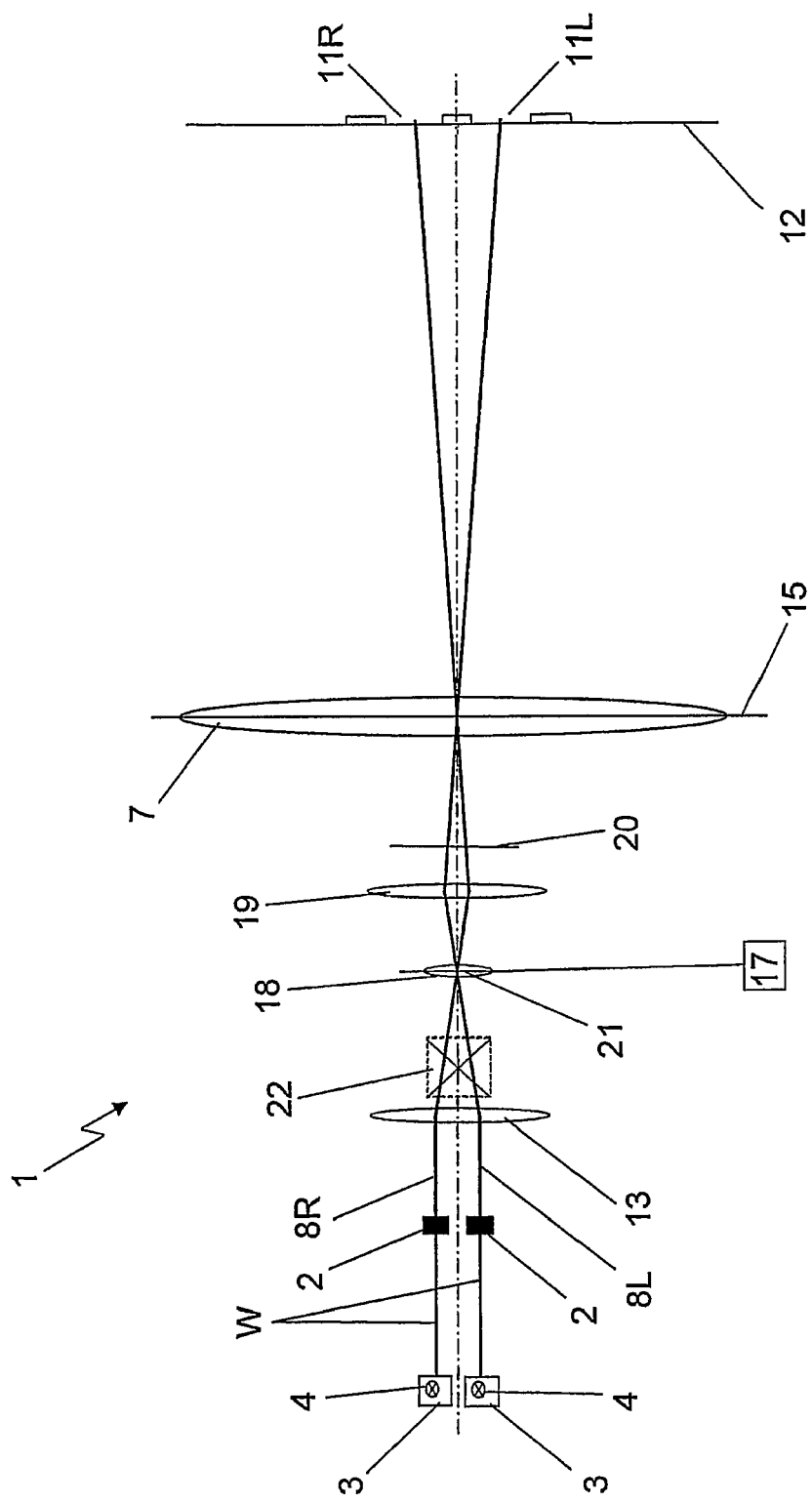
FIG. 6 shows a simplified embodiment of the projection device according to this invention shown in FIG. 5 (top view).

FIG. 6 shows a simplified embodiment of the projection device 1 shown in FIG. 5. Again, only one observer is shown in the Figure. However, generally multiple observers can view the reconstructed scene. The light modulator devices 2 used here are also two-dimensional light modulator devices, as explained in conjunction with FIG. 5. In this embodiment too, only one deflection means 18 is provided to track the observer windows 11R and 11L, or multiple observer windows. If the lens element 14 and the imaging means 6 form an afocal system, as shown in FIG. 5, these optical elements can be omitted, as shown in FIG. 6. This results in a very simply structured projection device 1. However, this arrangement makes it very difficult to correct aberrations, such as chromatic aberration.

For the reconstruction of the three-dimensional scene, one light modulator device 2 each is again provided for the right and for the left eye. These two light modulator devices 2 are illuminated with sufficiently coherent light by the two light sources 4 of the illumination devices 3. The waves W arrive at the light modulator devices 2, where they are encoded to form the desired wave fronts 8R and 8L. The wave fronts 8R and 8L are then imaged by the lens element 13 and the second imaging means 19 into the focal plane 20, and further by the screen 7 into the observer windows 11R and 11L and on to the observer eyes. At the same time, the Fourier transforms FT of the wave fronts 8R and 8L are created between the lens element 13 and the second imaging means 19, more specifically in the focal plane 21 of lens element 13, in which the deflection means 18 is situated. The Fourier transforms FT are then imaged by the second imaging means 19 on to the screen 7. The wave fronts 8R and 8L for the right and left observer windows 11R and 11L are imaged at the same time. The three-dimensional scene is again reconstructed in the zeroth diffraction order. Any movement of the observer in the observer plane 12 is also detected by the position detection system 17, which monitors the observer eye positions, and the deflection means 18 is controlled such that the observer windows 11R and 11L are tracked in accordance with the new eye positions of the observer. The three-dimensional scene can be reconstructed in colour as described above using the beam splitter element 22.

Instead of using two light modulator devices 2, it is again also possible to use only one light modulator device 2 to reconstruct a scene for one or multiple observers. Accordingly, only one light source will be necessary to illuminate the light modulator device 2.

If multiple observers are situated in the observer plane 12, as shown in FIG. 5, the pair of right and left wave fronts for the observer windows 11R and 11L will firstly be delivered to one observer, and then, through the deflection element 18, to the next observer. Then, the next pair of wave fronts will be successively delivered to the individual observers, and so on. Alternatively, as already described above, it is also possible to firstly deliver the wave front for the right-eye observer window 11R to the individual observers one after another, and then the wave front for the left-eye observer window 11L to the individual observers one after another. Then the next scene will be reconstructed accordingly.

In this embodiment, it is also possible to use only one light modulator device 2 for both observer eyes, as described in conjunction with FIG. 5, which serves the observer windows 11R and 11L one after another.

Figure 7:
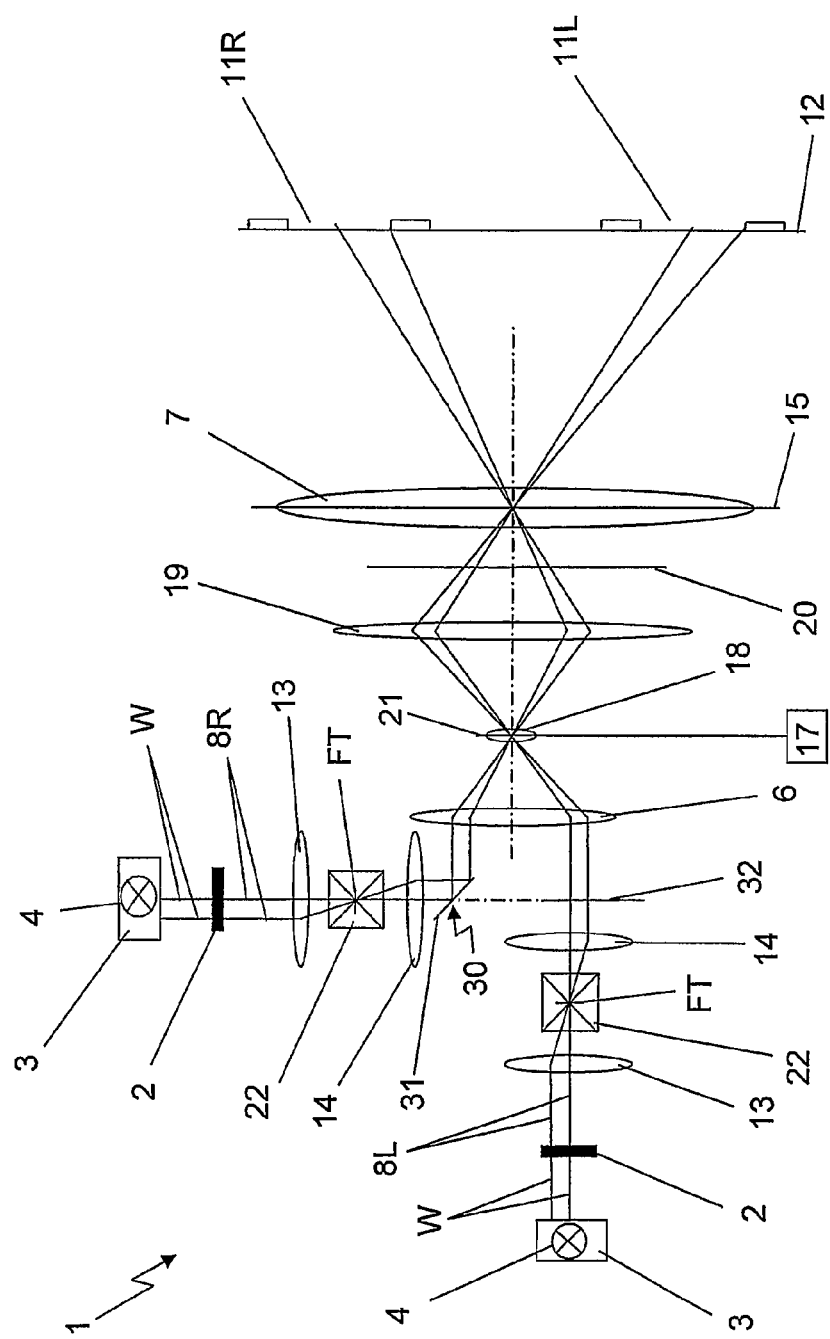
FIG. 7 illustrates another possible embodiment of the projection device shown in FIG. 5 (top view).

FIG. 7 shows another embodiment of the projection device 1, wherein the projection device 1 is shown for only one observer. However, it is generally possible to use this projection device 1 for multiple observers. The light modulator devices 2 can be one-dimensional, two-dimensional or two-dimensional binary light modulator devices. If one-dimensional light modulator devices are used, two deflection elements 9 must be provided, as shown in FIGS. 1 and 3. If two-dimensional binary light modulator devices are used, it will be advantageous if the light modulator devices 2 are fast enough to allow multiple observers to view the reconstructed scene. If this is not the case, only one observer will be able to view the reconstructed scene. In this embodiment, only one deflection means 18 is provided to track the observer windows 11R and 11L, or multiple observer windows, as shown in FIGS. 5 and 6. The imaging elements of this projection device 1 have a smaller numerical aperture (NA), and thus show less aberration, than the projection device 1 according to FIGS. 5 and 6. Because the lens elements 13, 14 and the beam splitter element 22 are provided twice, that is one for each light modulator device 2, or one for each observer eye, so that the wave fronts W are imaged through the first part of the projection device 1 independently of each other, adjustment errors can be compensated individually for each eye.

The three-dimensional scene is reconstructed with the help of one light modulator device 2 each for the right and for the left eye. These two light modulator devices 2 are illuminated with sufficiently coherent light by the two light sources 4 of the illumination devices 3. The wave fronts W arrive at the light modulator devices 2, where they are encoded to form the desired wave fronts 8R and 8L. The wave fronts 8R and 8L are represented by two beams in this embodiment (so that only half of the wave fronts are shown). The wave front 8R is then imaged by the lens elements 13 and 14 into an image-side focal plane 30 of lens element 14. A deflection element 31 in the form of an unmovable deflection mirror is situated in the focal plane 30. The deflection element 31 reflects the wave front 8R into the desired direction. The wave front 8L is similarly imaged by the lens elements 13 and 14, but into a focal plane 32. At the same time, the Fourier transforms FT of the wave fronts 8R and 8L are generated between lens elements 13 and 14, in the image-side focal plane of lens element 13. The two Fourier transforms FT are then imaged by the lens elements 14 and the imaging means 6 into the focal plane 21. The wave fronts 8R and 8L are then imaged by the imaging means 6 and 19 into the focal plane 20, and further by the screen 7 into the observer windows 11R and 11L and on to the observer eyes. At the same time, the images of the Fourier transforms FT in the focal plane 21 are imaged on to the screen 7 by the second imaging means 19. The wave fronts 8R and 8L for the right and left observer windows 11R and 11L are imaged at the same time. The three-dimensional scene is again reconstructed in the zeroth diffraction order. The position detection system 17 detects any changes in the observer eye positions if the observer moves in order to track the observer windows 11R and 11L in the observer plane 12. The position detection system 17 also controls the deflection means 18 such that the observer windows 11R and 11L are tracked in accordance with the new eye positions of the observer.

If multiple observers are situated in the observer plane 12 to view the reconstructed scene, the pair of right and left wave fronts will be delivered to the individual observers one after another. Then, the next pair of wave fronts will be successively delivered to the individual observers; and so on.

The three-dimensional scene can be reconstructed in colour as described above using two beam splitter elements 22, which may be disposed between the lens elements 13 and 14. Of course, the beam splitter elements 22 may be disposed at any other suitable position in the projection device 1. According to FIG. 7, the projection device 1 can also be designed such that the optical paths remain unfolded.

Further, the illumination devices 3 with the light sources 4 can be disposed at any suitable position in the projection device 1. For example, if the light modulator device 2 is not of a transmissive type, but of a reflective type, each illumination device 3 can be arranged such that the emitted wave front W is imaged on to the respective light modulator device 2 by a deflection element, such as a reflective or semi-transmissive mirror. It is advantageous if the light source 4 is imaged into a Fourier plane, in which the deflection element is disposed. At least one optical element, such as a lens, mirror etc., can be provided between the deflection element and the light modulator device 2. Referring to FIG. 7, such a deflection element may be disposed near the deflection means 18 or where the beam splitter element 22 used to be disposed; the beam splitter element 22 may in such a case be disposed in front of or behind the deflection element, or at any other suitable position in the projection device 1. This makes it possible to give the projection device 1 a more compact design.

In all embodiments, the individual light sources 4 may be generated by at least one optical element from one primary light source (not shown).

Further, it is possible in all embodiments to reconstruct the scene in any other than the $0^{th}$ diffraction order, e.g. in the $1^{st}$ or (minus) $-1^{st}$ diffraction order.

Possible applications of the holographic projection device 1 include displays for a two- and/or three-dimensional presentation in private or working environments, for example computer displays, TV screens, electronic games, in the automotive industry for displaying information, in the entertainment industry, in medical engineering, here in particular for minimally-invasive surgery applications or spatial representation of tomographic information, and in military engineering for the representation of surface profiles. It will appear to those skilled in the art that the projection device 1 can also be applied in other areas not mentioned above.

The invention claimed is:

1. Projection device for holographic reconstruction of a scene with at least one light source which emits sufficiently coherent light and at least one light modulator device to generate an encoded wave front of the scene, comprising imaging means for imaging a Fourier transform (FT) of the light modulated by a light modulator device on to a screen, and for imaging the encoded wave front into at least one virtual observer window in an observer plane, and at least one deflection means, which is disposed between the light modulator device and the screen for tracking the observer window according to a change in an eye position of at least one observer.

2. Projection device according to claim 1 wherein the reproduction scale and size of the screen are chosen such that a periodic continuation of the diffraction orders of the Fourier transform (FT) lies outside the screen.

3. Projection device according to claim 1 wherein the light modulator device is one-dimensional.

4. Projection device according to claim 3 comprising a deflection element for generating a wave front for a reconstructed scene, said deflection element realizing an optical deflection at a right angle to the one-dimensional light modulator device.

5. Projection device according to claim 1, comprising a binary two-dimensional light modulator device.

6. Projection device according to claim 1 further comprising a position detection system for the detection of changes in an eye position of the observer.

7. Projection device according to claim 1 for multiple observers wherein for tracking the observer windows, one deflection means per observer, one collimating lenticular array common to all deflection means, and a common focusing element are disposed one after another, seen in the direction of light propagation.

8. Projection device according to claim 1, wherein at least one beam splitter element is disposed between the deflection means and the light modulator device.

9. Projection device according to claim 8 wherein for colour reconstruction of a scene the beam splitter element is used to split the light up into its spectral components or to recompose the light from these components.

10. Projection device according to claim 8 wherein, if a two-dimensional binary light modulator device is used, the device comprises the beam splitter element for colour reconstruction of a scene and another beam splitter element for the multiplication of a wave front which is emitted by the light modulator device.

11. Projection device according to claim 1 wherein the deflection means is a mirror and/or wherein the screen is a mirror, in a particular, a concave mirror.

12. Projection device according to claim 1 comprising in the optical path lens elements in order to minimize aberrations and/or wherein the light modulator device is a phase modulator.

13. Method for holographic reconstruction of scenes wherein:
   an illumination device with at least one sufficiently coherent light source illuminates at least one light modulator device with an encoded wave front;
   wherein a Fourier transform (FT) of the light emitted by the light source and modulated by the light modulator device is imaged on to an optical element which serves as a screen;
   wherein at least the optical element images the encoded wave front into at least one virtual observer window in an observer plane; and
   wherein at least one deflection means tracks the observer window in accordance with a change in an eye position of at least one observer, the deflection means being disposed between the light modulator device and the optical element serving as a screen.

14. Method according to claim 13 wherein the light modulator device and the optical element define a reproduction scale, which is chosen together with the size of the optical element such that a periodic continuation of diffraction orders of the Fourier transform (FT) lies outside the optical element.

15. Method according to claim 13 wherein the scene is reconstructed in the zeroth diffraction order and/or wherein at least one imaging means images the Fourier transform (FT) of the wave front on to the optical element.

16. Method according to claim 13 wherein a position detection system detects and follows an eye position of the observer who views the reconstructed scene and/or wherein, for two or more observers only one light modulator device is used to generate the wave front for all left or all right eyes of the observers, where multiple light sources direct light to the light modulator device at different angles of incidence.

17. Method according to claim 13 wherein a one-dimensional light modulator device generates a one-dimensionally modulated wave front wherein a wave front is generated by a deflection element.

18. Method according to claim 13 wherein a colour reconstruction of the scene is performed simultaneously for the three primary colours and/or wherein a two-dimensional binary light modular device is provided, wherein a first beam splitter element multiplies a wave front emitted by the light modulator device and at least one further beam slitter element realises a colour reconstruction of the scene simultaneously in the three primary colours.

19. Method according to claim 18 wherein the simultaneous colour reconstruction of the scene is performed by three light modulator devices, where the second beam splitter element recomposes the individual monochromatic wave fronts of the light modulated by the light modulator devices.

* * * * *